US012651068B2

(12) United States Patent
Kim et al.

(10) Patent No.: US 12,651,068 B2
(45) Date of Patent: Jun. 9, 2026

(54) METHOD AND APPARATUS FOR UPDATING FIRMWARE

(71) Applicant: SAMSUNG ELECTRONICS CO., LTD., Suwon-si (KR)

(72) Inventors: Sewon Kim, Suwon-si (KR); Kyung-Woo Noh, Suwon-si (KR); Subin Seo, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 69 days.

(21) Appl. No.: 18/600,100

(22) Filed: Mar. 8, 2024

(65) Prior Publication Data

US 2025/0061202 A1     Feb. 20, 2025

(30) Foreign Application Priority Data

Aug. 17, 2023     (KR) ........................ 10-2023-0107881

(51) Int. Cl.
*G06F 21/57*          (2013.01)
*H04L 9/06*           (2006.01)
*H04L 9/08*           (2006.01)

(52) U.S. Cl.
CPC .......... *G06F 21/572* (2013.01); *H04L 9/0656* (2013.01); *H04L 9/0825* (2013.01)

(58) Field of Classification Search
None
See application file for complete search history.

(56) References Cited

U.S. PATENT DOCUMENTS

| | | | |
|---|---|---|---|
| 9,015,455 B2 | 4/2015 | Held et al. | |
| 9,525,555 B2 | 12/2016 | Dewan et al. | |
| 10,206,114 B2 | 2/2019 | Choi et al. | |
| 10,872,155 B2 * | 12/2020 | Oh .......................... | G06F 21/64 |
| 10,887,770 B2 | 1/2021 | Choi et al. | |
| 11,321,466 B2 | 5/2022 | Le Roy et al. | |
| 12,400,039 B2 * | 8/2025 | Zeng ..................... | G06F 21/645 |
| 2004/0025036 A1 * | 2/2004 | Balard .................. | G06F 21/575 |
| | | | 713/176 |
| 2012/0005480 A1 * | 1/2012 | Batke ................... | G06F 21/572 |
| | | | 713/175 |
| 2012/0079287 A1 * | 3/2012 | Leclercq .............. | G06F 21/575 |
| | | | 713/192 |

(Continued)

FOREIGN PATENT DOCUMENTS

| | | |
|---|---|---|
| CN | 112084472 B | 5/2022 |
| KR | 10-1782378 B1 | 9/2017 |
| KR | 10-2139546 B1 | 7/2020 |

*Primary Examiner* — Michael Pyzocha
(74) *Attorney, Agent, or Firm* — Sughrue Mion, PLLC

(57)          ABSTRACT

A method for updating firmware of an electronic device includes verifying a first firmware certificate using a first public key, based on at least one of the electronic device being supplied power or the electronic device being reset, verifying a first firmware code included in the first firmware image based on a first hash value included in the first firmware certificate, and operating the electronic device using the first firmware code, based on the verifying of the first firmware certificate and the verifying of the first firmware code being successful. The first firmware certificate being included in a first firmware image stored in a memory of the electronic device.

19 Claims, 7 Drawing Sheets

(56) References Cited

U.S. PATENT DOCUMENTS

| | | | | |
|---|---|---|---|---|
| 2012/0124567 A1* | 5/2012 | Landry | G06F 8/654 | |
| | | | | 717/168 |
| 2012/0260082 A1* | 10/2012 | Bobzin | G06F 21/572 | |
| | | | | 713/100 |
| 2013/0185564 A1* | 7/2013 | Jaber | G06F 21/57 | |
| | | | | 713/176 |
| 2015/0261521 A1* | 9/2015 | Choi | H04L 9/3236 | |
| | | | | 713/176 |
| 2016/0182238 A1 | 6/2016 | Dewan et al. | | |
| 2017/0010881 A1* | 1/2017 | Kawazu | G06F 8/654 | |
| 2018/0330095 A1* | 11/2018 | Packer Ali | H04L 9/3247 | |
| 2019/0191310 A1 | 6/2019 | Choi et al. | | |
| 2019/0278914 A1 | 9/2019 | Le Roy et al. | | |
| 2019/0278915 A1 | 9/2019 | Kim et al. | | |
| 2020/0097658 A1* | 3/2020 | Samuel | G06F 11/0793 | |
| 2020/0162247 A1* | 5/2020 | Nix | H04L 9/0841 | |
| 2020/0228346 A1* | 7/2020 | Sakata | H04L 9/30 | |
| 2020/0311278 A1* | 10/2020 | Lin | G06F 21/575 | |
| 2021/0176056 A1* | 6/2021 | Cai | H04L 9/3263 | |
| 2022/0075873 A1* | 3/2022 | Gao | H04L 9/0894 | |
| 2022/0156377 A1* | 5/2022 | Xie | G06F 8/65 | |
| 2022/0224546 A1* | 7/2022 | Cao | H04L 9/006 | |
| 2022/0405392 A1* | 12/2022 | Nix | H04L 9/3249 | |
| 2023/0103736 A1* | 4/2023 | Liu | H04L 9/3247 | |
| | | | | 713/171 |
| 2023/0222219 A1* | 7/2023 | Park | G06F 21/64 | |
| | | | | 726/18 |
| 2023/0254137 A1* | 8/2023 | Liu | H04L 9/0844 | |
| | | | | 380/44 |
| 2023/0353391 A1* | 11/2023 | Dover | H04L 9/3268 | |
| 2024/0187262 A1* | 6/2024 | Armour | H04L 9/3073 | |
| 2024/0205021 A1* | 6/2024 | Eilam | G06F 21/6245 | |
| 2025/0053407 A1* | 2/2025 | Chung | H04L 9/30 | |

* cited by examiner

Signature generator ~110

Certificate generator ~120

Firmware generator ~100

900

| First device | Second device |
|---|---|
| 910 | 920 |
| 911 Transmitter | Transmitter 921 |
| 913 Processor | Processor 923 |
| 912 Receiver | Receiver 922 |

METHOD AND APPARATUS FOR UPDATING FIRMWARE

CROSS-REFERENCE TO RELATED APPLICATIONS

This application claims benefit of priority under 35 U.S.C. § 119 to Korean Patent Application No. 10-2023-0107881, filed on Aug. 17, 2023, in the Korean Intellectual Property Office, the disclosure of which is incorporated by reference herein in its entirety.

BACKGROUND

1. Field

The present disclosure relates generally to electronic devices, and more particularly, to a method for updating firmware of an electronic device, and an apparatus using the same.

2. Description of Related Art

Firmware may refer to software included in a specific hardware device. For example, firmware may refer to a software type of an operating system responsible for controlling and/or driving hardware, such as, but not limited to, electronic devices. The firmware may be stored and/or updated in a read only memory (ROM), a programmable ROM (PROM), and the like, within an electronic device.

Related techniques for performing secure booting of an electronic device may involve starting the secure boot using an immutable key. Alternatively or additionally, the electronic device may implement a key rotation function in which a mutable key may be applied to the firmware. That is, the firmware of the electronic device may be provided through a keychain with an immutable key for performing secure booting and a mutable key for performing key rotation.

SUMMARY

One or more example embodiments of the present disclosure provide a method for verifying firmware for updating an electronic device.

Further, one or more example embodiments of the present disclosure provide a method for distributing a firmware image for updating an electronic device.

Further, one or more example embodiments of the present disclosure provide a device for verifying firmware for updating an electronic device.

According to an aspect of the present disclosure, a method for updating firmware of an electronic device includes verifying a first firmware certificate using a first public key, based on at least one of the electronic device being supplied power or the electronic device being reset, verifying a first firmware code included in the first firmware image based on a first hash value included in the first firmware certificate, and operating the electronic device using the first firmware code, based on the verifying of the first firmware certificate and the verifying of the first firmware code being successful. The first firmware certificate being included in a first firmware image stored in a memory of the electronic device.

According to an aspect of the present disclosure, a method for generating a firmware image of an electronic device includes generating, using a first private key, a firmware signature of a firmware code, generating a firmware certificate based on the firmware code and the firmware signature, generating the firmware image including the firmware code, the firmware signature, and the firmware certificate, and providing the firmware image to a firmware distribution device, causing the firmware distribution device to distribute the firmware image to one or more devices.

According to an aspect of the present disclosure, a device for updating firmware of an electronic device includes one or more processors, and a memory storing instructions that, when executed by the one or more processors, cause the device to verify a first firmware certificate using a first public key, verify a first firmware code included in the first firmware image based on a first hash value included in the first firmware certificate, and operate the electronic device using the first firmware code based on verification of the first firmware certificate and verification of the first firmware code being successful. The first firmware certificate being included in a first firmware image stored in the memory of the electronic device.

The time required for the electronic device to verify the firmware when the electronic device is booted may be saved and/or reduced by binding the hash value for the firmware code within the firmware certificate. In addition, the firmware code may be verified when the firmware is downloaded, and when the firmware certificate is verified when the electronic device is booted, the firmware code may be verified briefly using the firmware hash value, thereby potentially saving and/or reducing the entire booting time.

BRIEF DESCRIPTION OF THE DRAWINGS

The above and other aspects, features, and advantages of certain embodiments of the present disclosure may be more apparent from the following description taken in conjunction with the accompanying drawings, in which.

DETAILED DESCRIPTION

Figure 1:
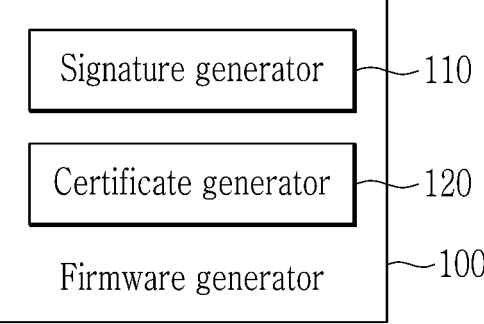
FIG. 1 shows a device that generates a firmware image, according to an embodiment.

Hereinafter, with reference to accompanying drawings, various embodiments of the present disclosure are described such that a person of an ordinary skill may practice them in the technical field to which the present disclosure belongs. The present disclosure may be implemented in many different forms and may not be limited to the embodiments described herein. In order to describe the present disclosure with reference to the drawings, parts not related to the description may be omitted, and similar reference numerals may be designated to similar parts throughout the present disclosure.

In addition, unless explicitly described to the contrary, the word "comprise", and variations such as "comprises" or "comprising", may be understood to imply the inclusion of stated elements but not the exclusion of any other elements.

In the present disclosure, expressions described in the singular may be construed in the singular or plural unless an explicit expression such as "one" or "single" is used.

In the present disclosure, "and/or" may include each of the constituent elements mentioned and any combination of one or more of them. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases.

In the present disclosure, the terms including ordinal numbers such as first, second, and the like, may be used to describe various elements, but the elements may not be limited by the terms. The terms may be used only for the purpose of distinguishing one element from another element. For example, without departing from the range of the technology disclosed in the present disclosure, a first constituent element may be named a second constituent element, and similarly, a second constituent element may be named a first constituent element.

Reference throughout the present disclosure to "one embodiment," "an embodiment," "an example embodiment," or similar language may indicate that a particular feature, structure, or characteristic described in connection with the indicated embodiment is included in at least one embodiment of the present solution. Thus, the phrases "in one embodiment", "in an embodiment," "in an example embodiment," and similar language throughout this disclosure may, but do not necessarily, all refer to the same embodiment. The embodiments described herein are example embodiments, and thus, the disclosure is not limited thereto and may be realized in various other forms.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, controller, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like.

Hereinafter, various embodiments of the present disclosure are described with reference to the accompanying drawings.

Figure 2:
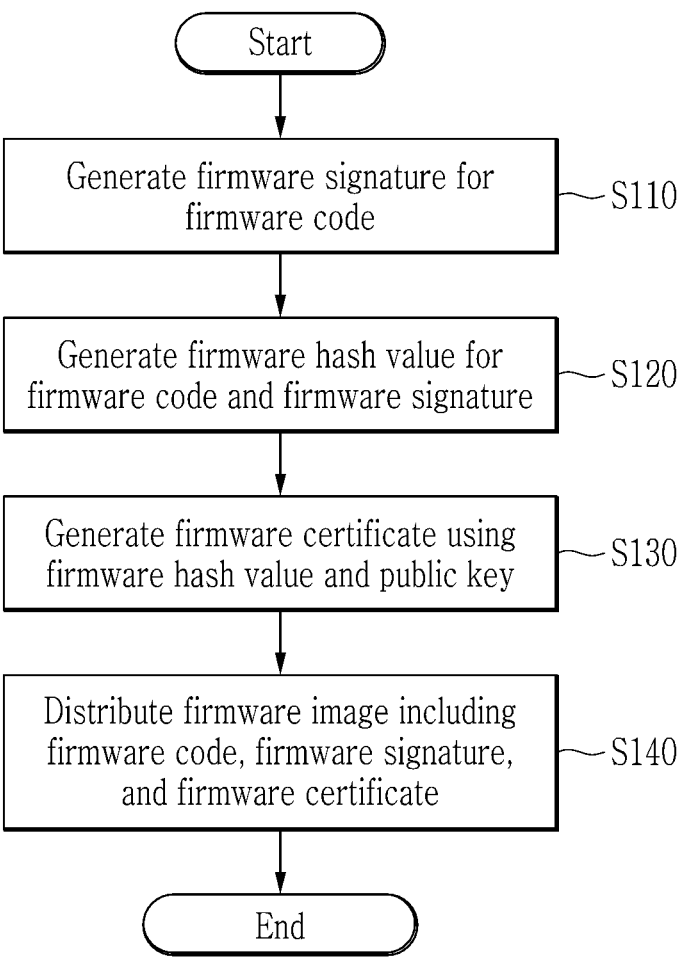
FIG. 2 is a flowchart of a method for generating a firmware image, according to an embodiment.
Figure 3:
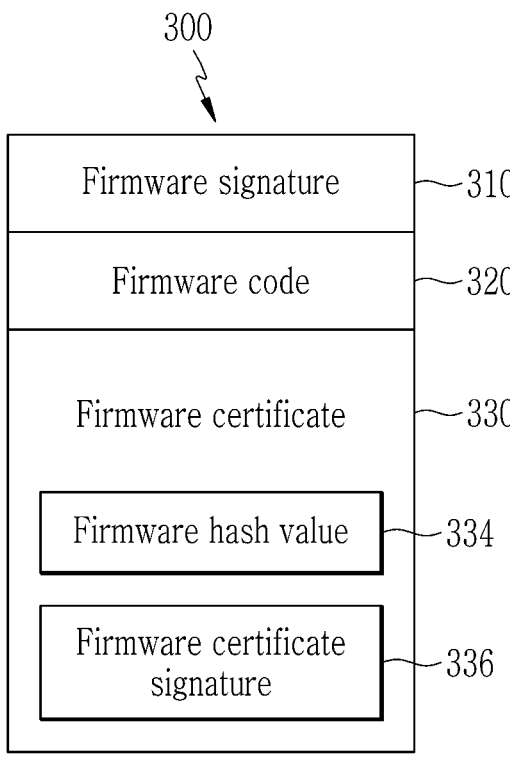
FIG. 3 shows a firmware image, according to an embodiment.

FIG. 1 shows a device that generates a firmware image, according to an embodiment. FIG. 2 is a flowchart of a method for generating a firmware image, according to an embodiment. FIG. 3 shows a firmware image, according to an embodiment.

As used herein, firmware may refer to software for controlling and/or driving an electronic device. According to an embodiment, a firmware image that includes the firmware may be generated by a firmware generator 100, as shown in FIG. 1. In an embodiment, the firmware generator 100 of the electronic device may be operated by a central processing unit (CPU) and a memory. Alternatively or additionally, the electronic device may include a storage device such as, but not limited to, a hard disk drive (HDD), a solid state drive (SSD), and the like.

Referring to FIG. 1, a firmware generator 100 may include a signature generator 110 and a certificate generator 120. The firmware generator 100 may generate a firmware image by using the signature generator 110 and the certificate generator 120. The generated firmware image may be distributed by a firmware distribution device.

The number and arrangement of components of the firmware generator 100 shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may be integrated with each other, and/or may be implemented as an integrated circuit, as software, and/or a combination of circuits and software.

In an embodiment, the signature generator 110 and the certificate generator 120 may be physically positioned (disposed) in different devices. For example, the signature generator 110 may be disposed with a firmware manufacturing and/or generating device, and the signature generator 110 may generate a firmware signature of a firmware code using a firmware private key. As another example, the certificate generator 120 may be disposed with a firmware distributor, and the certificate generator 120 may generate a certificate signature of the firmware authentication certificate using a private key of the firmware authentication certificate.

Referring to FIG. 2, the signature generator 110 of the firmware generator 100 may generate a firmware signature for a firmware code when the firmware code is generated (operation S110). The signature generator 110 may generate a hash value for the firmware code and encrypt the hash value of the firmware code using a firmware private key for firmware signature, thereby generating the firmware signature. In an embodiment, a ciphertext of the hash value of the firmware code may be generated as a firmware signature. The signature generator 110 may output a unique value that may uniquely identify the firmware code using a one-way function. For example, the signature generator 110 may generate a hash value for a firmware code by inputting the firmware code into a predetermined hash function.

In an embodiment, the private key used in generation of the firmware signature may correspond to a firmware public key stored in the running (e.g., currently executing) firmware of the electronic device. The signature generator 110 may generate a firmware signature using the firmware private key corresponding to the firmware public key inserted into the running firmware of the electronic device. That is, when the electronic device is in use, the firmware public key stored in the running firmware may be used to verify a firmware signature of newly downloaded firmware.

In an embodiment, the firmware private key and/or firmware public key used to generate the firmware signature may be and/or may include a mutable key. That is, the firmware generator 100 may generate a firmware signature using a mutable key, thereby implementing key rotation. The firmware generator 100 may generate a new pair of keys as necessary, insert a firmware public key of the new pair of keys, and/or generate a firmware signature using a firmware private key.

In an embodiment, the firmware generator 100 may insert a new firmware public key into the firmware code of the firmware image to be transmitted for update when a change in the firmware private key and/or firmware public key is needed. The firmware generator 100 may sign a firmware code of firmware to be updated after the key change using an existing firmware private key (e.g., key before the change), and may insert a new firmware public key (e.g., key after the change) into the firmware code in the firmware image to be transmitted for update after the key change. Consequently, the firmware generator 100 may use a new firmware private key when generating a firmware signature of the next firmware. In an embodiment, the firmware generator 100 may implement key rotation using the above-described method.

The certificate generator 120 of the firmware generator 100 may generate a firmware hash value for a firmware code and a firmware signature (operation S120). In an embodiment, the certificate generator 120 may output a unique value that may uniquely identify the firmware code and a firmware signature using a one-way function. For example, the certificate generator 120 may input the firmware and the firmware signature to a predetermined hash function to generate a firmware hash value for the firmware code and the firmware signature.

When the firmware hash value is generated, the certificate generator 120 may generate a firmware certificate using the firmware hash value and a certificate private key (operation S130). The certificate public key may be determined by a certificate public key and/or information on the certificate public key stored in the electronic device. For example, when the certificate generator 120 has a certificate private key corresponding to the certificate public key inserted into the electronic device when manufacturing the electronic device, and when the firmware code for updating the firmware of a specific electronic device is written, the certificate generator 120 may generate a signature of a firmware certificate for the corresponding firmware code using the private key.

In an embodiment, a certificate public key of a certificate key pair may be stored in a memory (e.g., a read only memory (ROM), a one-time programmable (OTP) memory, and the like) of the electronic device. For example, the certificate public key may be stored in a memory of an SSD as a part of a ROM code (e.g., execution code in the ROM) in the ROM of the SSD, and the certificate generator 120 may hold information about the certificate public key recorded in the ROM of a specific electronic device. The certificate generator 120 may generate a certificate signature of a firmware certificate for a corresponding electronic device using a certificate private key corresponding to a certificate public key stored in the electronic device, and the generated certificate signature may be included in the firmware certificate.

In an embodiment, the certificate public key and/or certificate private key may be used as an immutable key. For example, an immutable certificate public key may be stored in an electronic device when the electronic device is manufactured such that the certificate signature of the firmware certificate may be generated using the immutable certificate private key, and thus, secure boot through the electronic device may be implemented.

In an embodiment, the certificate generator 120 may insert a firmware hash value into an extended area (and/or extended field) in the firmware certificate. Alternatively or additionally, the certificate generator 120 may generate a certificate signature of the firmware certificate using a certificate private key corresponding to the certificate public key. The certificate generator 120 may calculate the hash value of the firmware certificate and may encrypt the calculated hash value using the certificate private key to generate a certificate signature of the certificate. In an embodiment, the certificate generator 120 may input the firmware certificate, including the firmware hash value, into the hash function for generation of the certificate signature.

In an embodiment, the firmware certificate may include the firmware code and the firmware hash value for the firmware signature, and may further include a firmware certificate signature of the firmware certificate.

In an embodiment, a firmware distribution device may generate a firmware image in which a firmware code, a firmware signature, and a firmware certificate, and distribute the generated firmware image online (operation S140).

Referring to FIG. 3, the firmware image 300, according to an embodiment, may include a firmware signature 310, a firmware code 320, and a firmware certificate 330. As shown in FIG. 3, the firmware certificate 330 may include a firmware certificate signature 336, and the extended field of the firmware certificate may include a firmware hash value 334.

As described above, the signature generator 110 of the firmware generator 100 may generate a hash value for a firmware code 320 and encrypt the hash value of the firmware code 320 using a firmware private key, to generate a firmware signature 310. The firmware private key used for encryption of the hash value of the firmware code 320 may correspond to a firmware public key, and the firmware public key may be disposed in firmware that has been already installed in the electronic device. That is, the firmware public key corresponding to a mutable firmware private key may be included in firmware, which may be installed and operating (e.g., executing) on the electronic device before changing the firmware private key. Alternatively or additionally, key rotation may be implemented by changing the firmware public key and/or firmware private key.

The certificate generator 120 of the firmware generator 100 may generate the firmware certificate 330 based on the firmware code 320 and the firmware signature 310. The certificate generator 120 may calculate a hash value (e.g., firmware hash value 334) for the firmware code 320 and the firmware signature 310 and insert the firmware hash value 334 into the firmware certificate 330. Alternatively or additionally, the certificate generator 120 may receive the firmware hash value 334 from the signature generator 110 and insert the firmware hash value 334 into the firmware certificate 330. The firmware hash value 334 may be inserted into the extended field of the firmware certificate 330. The firmware code 320 may be combined with the firmware certificate 330 by including the firmware hash value 334 in the extended field of the firmware certificate.

The certificate generator 120 may generate a firmware certificate signature 336 by encrypting the hash value of the firmware certificate (and/or a predetermined region of the firmware certificate) using the certificate private key. The firmware certificate signature 336 may be added to the firmware certificate 330.

The certificate generator 120 may calculate the hash value of the firmware certificate 330 by inputting certificate contents such as, but not limited to, an authentication date, an authentication authority, a certificate public key, and the like, into a hash function. In an embodiment, the certificate generator 120 may input the firmware hash value 334 for the firmware code 320 and the firmware signature 310 into the hash function.

The certificate private key for generating the firmware certificate may be determined based on information on the certificate public key inserted in a memory of an electronic device where firmware to be updated is to be installed. In an embodiment, secure booting may be implemented by a key pair of certificate public key and certificate private key, which may be and/or may include immutable keys.

Figure 4:
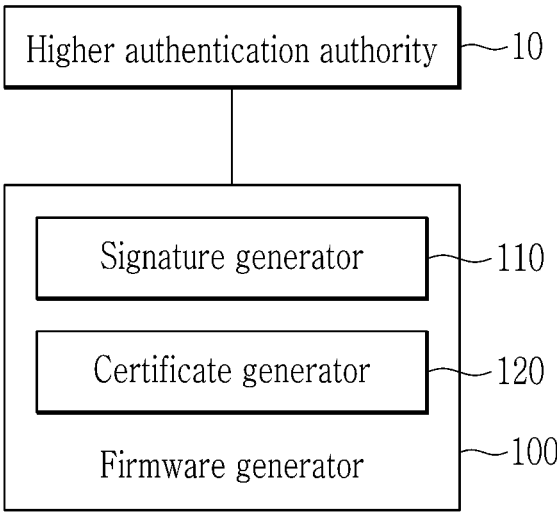
FIG. 4 is a block diagram of a certificate issuance system, according to an embodiment.

FIG. 4 is a block diagram of a certificate issuance system, according to an embodiment.

Referring to FIG. 4, the firmware generator 100 may generate a firmware certificate by forming a certificate chain with a higher authentication authority 10. That is, the higher authentication authority 10 may be a root certificate authority (CA) that may issue a root certificate and the firmware generator 100 may be an intermediate CA that may issue an intermediate certificate.

In an embodiment, the firmware certificate signature included in the firmware certificate may be encrypted using the certificate private key of the firmware generator 100, and the intermediate certificate of the firmware generator 100 may be encrypted using a root private key of the higher authentication authority 10. Therefore, when a certificate chain is formed with the higher authentication authority 10, the qualifications of the firmware generator 100 may be proven by the higher authentication authority 10.

Figure 5:
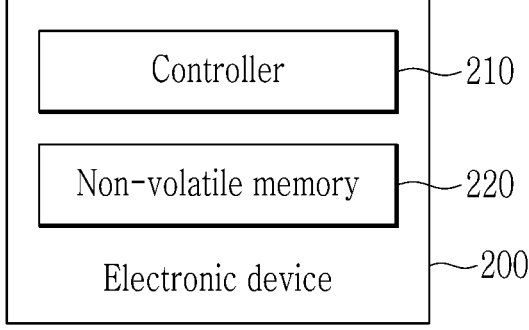
FIG. 5 is a block diagram of an electronic device, according to an embodiment.

FIG. 5 is a block diagram of an electronic device, according to an embodiment.

Referring to FIG. 5, the electronic device 200 may include a controller 210 and a storage portion 220. When the electronic device 200 is an SSD, the controller 210 may be and/or may be included in a controller of the SSD. The storage portion 220 may include a fixed memory such as, but not limited to, a ROM, a non-volatile memory such as a flash memory, and the like.

The controller 210 may check whether firmware to be updated exists through a search (e.g., an online search) and download the firmware image when an update to the firmware is available and/or when the firmware needs to be updated. The controller 210 may download the firmware image of the firmware to be updated while executing the existing firmware.

The controller 210 may store the downloaded firmware image in the storage portion 220, and verify the stored firmware image. In an embodiment, the controller 210 may verify a firmware signature in the downloaded firmware image through the executing firmware, and when the verification of the firmware signature is successful, the downloaded firmware image may be stored in the storage portion 220. When the verification of the firmware signature fails (e.g., is not successful), the controller 210 may delete the downloaded firmware image.

In an embodiment, the controller 210 may execute software (e.g., system software such as, but not limited to, a bootstrap loader) stored in the storage portion 220 to boot the electronic device 200 and use new (e.g., updated) firmware. For example, when the electronic device 200 is powered on and/or reset, the controller 210 may execute system software to verify the firmware code and the firmware certificate by loading the firmware image stored in the storage portion 220, and when the verification is successful, the controller 210 may execute the new firmware code using the electronic device 200.

Figure 6:
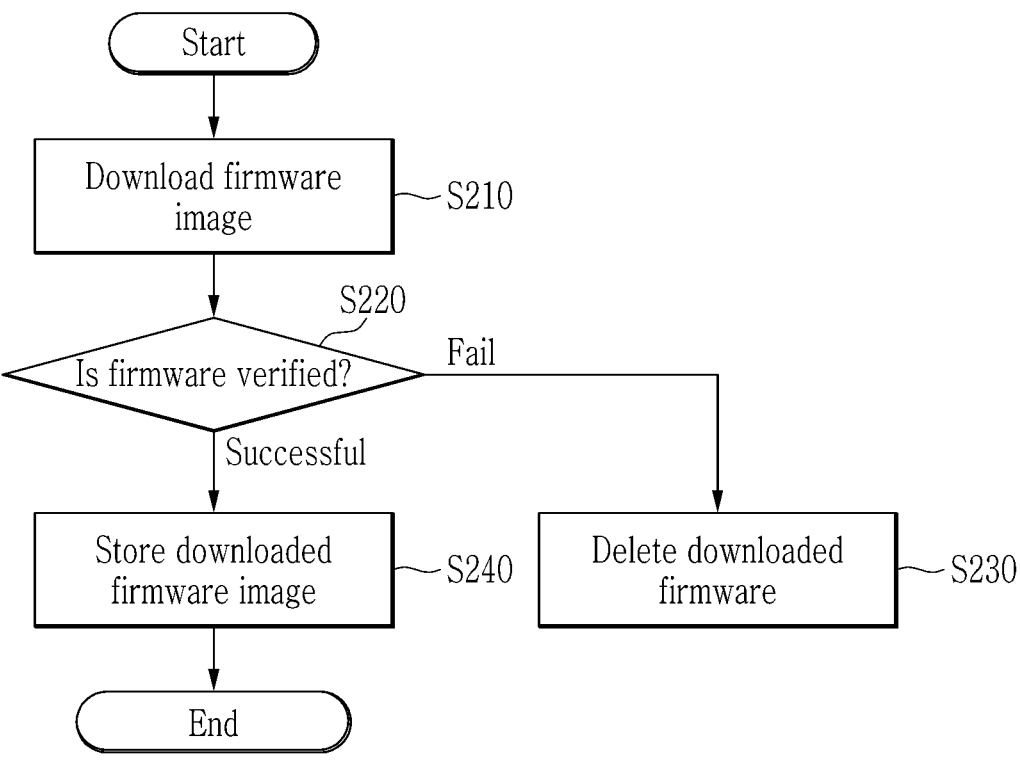
FIG. 6 is a flowchart of a method for downloading firmware, according to an embodiment.

FIG. 6 is a flowchart of a method for downloading firmware, according to an embodiment.

Referring to FIG. 6, when a firmware image is received by a download command (operation S210), the controller 210 may verify a firmware signature of the downloaded firmware image through running firmware (operation S220).

In an embodiment, the controller 210 may acquire a firmware public key from the running firmware, and may perform verification on the firmware signature in the firmware image using the firmware public key. The firmware public key may correspond to a firmware private key used in encryption of the firmware signature, and may be included in the existing running firmware before updated. In an embodiment, the controller 210 may use one or more algorithms to decrypt the firmware signature, such as, but not limited to, an elliptic curve cryptography (ECC) algorithm, a secure hash algorithm (SHA), and the like.

In operation S230, the controller 210 may delete the downloaded firmware image when the verification of the firmware fails (Fail of operation S220). However, when the verification of the firmware signature is successful (Successful of operation S220), the controller 210 may store the downloaded firmware image in a non-volatile memory of the storage portion 220 (operation S240). The controller 210 may execute new firmware after verifying a firmware code and a firmware certificate of the firmware stored in the non-volatile memory.

Figure 7:
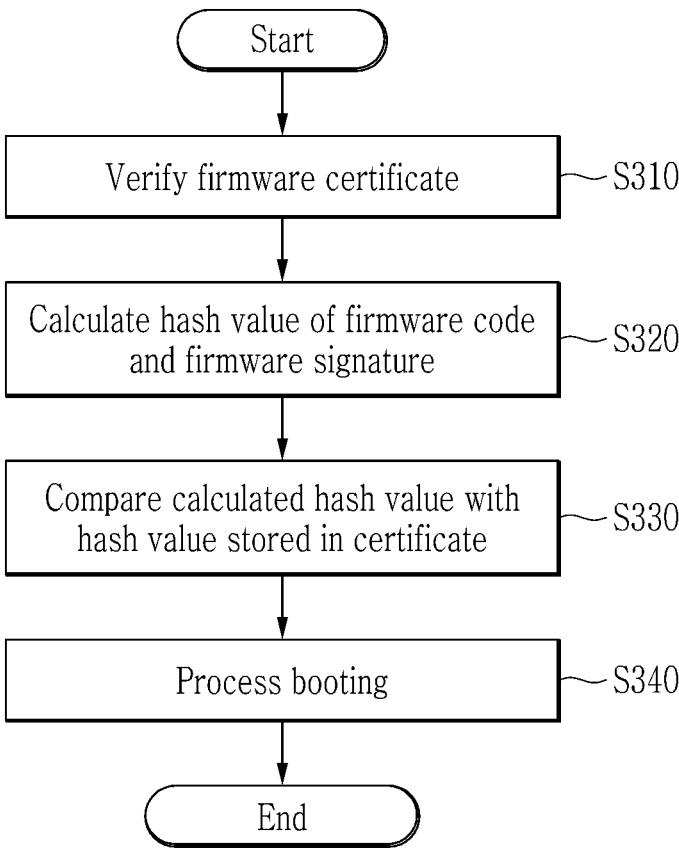
FIG. 7 is a flowchart of a method for verifying firmware, according to an embodiment.

FIG. 7 is a flowchart of a method for verifying firmware, according to an embodiment.

In an embodiment, the controller 210 of the electronic device 200 may verify the firmware certificate of the firmware image downloaded when booting the electronic device 200, may verify a firmware code, and may execute the electronic device 200 using the firmware image of which verification has been successful. Verification of the firmware certificate and the firmware code in the downloaded firmware image may be performed as a part of a booting procedure by a ROM code executed by the controller 210 without operating the existing firmware.

Referring to FIG. 7, when power is supplied to the electronic device 200 and/or the electronic device 200 is reset, the controller 210 may load a firmware image from a non-volatile memory of the storage portion 220 and may decode a firmware certificate signature of a firmware certificate, thereby verifying the firmware certificate (operation S310). The controller 210 may load a firmware image stored in the non-volatile memory to a volatile memory (e.g., a dynamic random access memory (DRAM)) and the like for verification of the firmware certificate.

In an embodiment, the controller 210 may decode the firmware certificate signature of the firmware certificate in the firmware image using a certificate public key to verify the firmware certificate. In an embodiment, the controller 210 may use the ECC algorithm and/or SHA, and the like to decrypt the firmware signature.

The certificate public key used by the controller 210 may be stored in the storage portion 220 of the electronic device 200. For example, the certificate public key may be disposed in the ROM and/or OTP of the storage portion 220, may be a part of the ROM code, and may be and/or may include an immutable key. The controller 210 may implement secure boot using an immutable certificate public key.

Referring to FIG. 7, the controller 210 may calculate a hash value of the firmware code and firmware signature in the firmware image (operation S320), and may compare the firmware hash value stored in the firmware certificate (e.g., the firmware hash value may be stored in the extended field of the firmware certificate) and the calculated hash value of the firmware code and the firmware signature (operation S330).

The controller 210 may calculate the hash value for the firmware code and firmware signature using a predetermined hash algorithm and/or hash function, and the predetermined hash algorithm and/or hash function may be the same as the hash algorithm and/or hash function used when the firmware hash value stored in the firmware certificate is calculated. However, the present disclosure is not limited in this regard and other hash algorithms and/or hash functions may be used. Information regarding the hash algorithm or hash function used to calculate the firmware hash value may be included in the electronic device 200 when manufacturing the electronic device 200.

In an embodiment, the controller 210 may determine whether a firmware code in the firmware image corresponds to the firmware certificate by determining whether the firmware hash value stored in the firmware certificate and the calculated hash value of the firmware code and firmware signature are equal to each other. When the firmware hash value stored in the extended field of the firmware certificate is equal to the calculated hash value of the firmware code and firmware, the controller 210 may determine that the firmware code in the firmware image is authenticated by the firmware certificate.

In an embodiment, the controller 210 may perform verification of the firmware certificate and verification of the firmware code in parallel and/or sequentially. For example, the controller 210 may check whether the hash value in the firmware certificate matches the calculated hash value after the firmware certificate has been verified, and/or may verify the firmware certificate after the hash value has been confirmed to match. Alternatively or additionally, the controller 210 may perform both firmware certificate verification and firmware code verification.

When the controller 210 fails to verify the firmware certificate or/or fails to verify the firmware code, the controller 210 may cancel the firmware update and proceed with the booting procedure using the existing firmware.

The controller 210 may continue the booting procedure using a new firmware when the firmware certificate is verified and the firmware code is verified (e.g., the firmware hash value matches the hash value calculated for the firmware code and firmware signature) (operation S340).

As described above, the time required for the electronic device to verify the firmware when the electronic device is booted may be saved and/or reduced by binding the hash value for the firmware code within the firmware certificate. In addition, the firmware code may be verified when the firmware is downloaded, and when the firmware certificate is verified when the electronic device is booted, the firmware code may be verified briefly using the firmware hash value, thereby potentially saving and/or reducing the entire booting time.

Figures 8, 9:
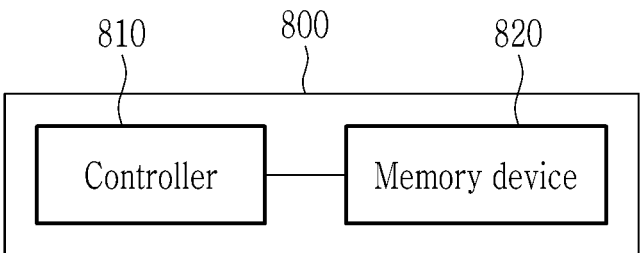
FIG. 8 is a block diagram of an electronic device, according to another embodiment.
FIG. 9 is a block diagram of an example of a system, according to an embodiment.

FIG. 8 is a block diagram of an electronic device, according to another embodiment.

Referring to FIG. 8, the electronic device 800 may include a controller 810 and a memory device 820.

The controller 810 may control a memory operation of the memory device 820 by providing a signal to the memory device 820 in response to a request from a host system (not shown). The signal may include an instruction and/or an address. For example, the controller 810 may read data from the memory device 820 by providing a read signal to the memory device 820. As another example, the controller 810 may write data to the memory device 820 by providing a write signal and data to the memory device 820.

In some embodiments, the memory device 820 may include a volatile memory such as, but not limited to, a DRAM, a static RAM (SRAM), and the like. In some embodiments, the memory device 820 may include a non-volatile memory such as, but not limited to, a flash memory, a phase-change memory (PCM), a resistive memory (RRAM), a magneto-resistive memory (MRAM), a ferro-electric memory (FRAM), or a polymer memory. In some embodiments, the memory device 820 may be used as a system memory of the host system. In an embodiment, the controller 810 may be provided as a chip separated from a processor of the host system. Alternatively or additionally, the controller 810 may be provided as an internal component of the processor. In some embodiments, the electronic device 800 may be used as a storage device of the host system.

The electronic devices described with reference to FIG. 1 to FIG. 7 may be included in the host system, the controller 810, and/or the memory device 820, and as such, may verify the firmware code and/or firmware certificate as described with reference to FIG. 1 to FIG. 7.

FIG. 9 is a block diagram of an example of a system, according to an embodiment.

Referring to FIG. 9, a system 900 may include a first device 910 and a second device 920.

The first device 910 may include a transmitter 911, a receiver 912, and a processor 913, and the second device 920 may include a transmitter 921, a receiver 922, and a processor 923. The transmitter 911 of the first device 910 may transmit data to the second device 920, and the receiver 922 of the second device 920 may receive the data. Similarly, the transmitter 921 of the second device 920 may transmit data to the first device 910, and the receiver 912 of the first device 910 may receive the data. The processor 913 may control operations of the transmitter 911 and the receiver 912, and the processor 923 may control operations of the transmitter 921 and the receiver 922.

The firmware generators and/or electronic devices described with reference to FIG. 1 to FIG. 7 may be included in the transmitter 911, the receiver 912, the transmitter 921, and/or the receiver 922 for transmitting/receiving firmware.

Although FIG. 8 and FIG. 9 illustrate an electronic device 800 and a system 900 in which the firmware generators and/or electronic devices described with reference to FIG. 1 to FIG. 7 may be used, the present disclosure is not limited thereto. For example, the firmware generator may generate a firmware image in various devices, and the electronic device may verify validity of the firmware and/or firmware certificate included in the firmware image.

In some embodiments, each constituent element, module, or unit expressed as a block in FIG. 1 to FIG. 9 may be implemented with a varying number of hardware, software, and/or firmware structures that execute each function described above depending on embodiments. For example, at least one constituent element, module, or unit may include various hardware constitute elements, which include a digital circuit, a programmable or non-programmable logic device or array, an application specific integrated circuit (ASIC), or other circuits that use digital circuit structures such as a memory, a processor, a logic circuit, a lookup table, and the like, may execute each function through one or more microprocessors or control of other control device. In addition, at least one constituent element, module, or unit may contain one or more executable instructions to perform a specific logic function and may be executed by one or more microprocessors or other control devices. In addition, at least one constituent element, module, or unit may include a processor such as a CPU or microprocessor that may perform each function, or may be implemented by a processor. Functional features of some embodiments may be implemented as algorithms running on one or more processors.

While the present disclosure has been described in connection with what is presently considered to be practical embodiments, it is to be understood that the present disclosure is not limited to the disclosed embodiments. On the contrary, the present disclosure may be intended to cover various modifications and equivalent arrangements included within the spirit and scope of the appended claims.

What is claimed is:

1. A method for updating firmware of an electronic device, the method comprising:
   verifying a first firmware certificate using a first public key of the electronic device, based on at least one of the electronic device being supplied power or the electronic device being reset, the first firmware certificate being comprised in a first firmware image stored in a memory of the electronic device;
   verifying a first firmware code comprised in the first firmware image based on a first hash value comprised in the first firmware certificate, the first hash value being generated by inputting the first firmware code and an encoded hash value of the first firmware code into a hash function, the encoded hash value of the first firmware code being encoded using a private key corresponding to a second public key different from the first public key; and
   operating the electronic device using the first firmware code, based on the verifying of the first firmware certificate and the verifying of the first firmware code being successful.

2. The method of claim 1, wherein the verifying of the first firmware certificate comprises:
   acquiring the first public key stored in the electronic device; and
   decoding, using the first public key, a first firmware certificate signature of the first firmware certificate.

3. The method of claim 1, further comprising:
   storing the first public key in at least one of a read only memory (ROM) or a one-time programmable (OTP) memory of the electronic device,
   wherein the first public key comprises an immutable key.

4. The method of claim 1, wherein the verifying of the first firmware code comprises:
   calculating a second hash value of a first firmware signature comprised in the first firmware image; and
   determining whether the verifying of the first firmware code is successful based on whether the second hash value is equal to the first hash value.

5. The method of claim 1, further comprising:
   downloading a second firmware image while operating the electronic device using the first firmware code;
   verifying, using the second public key, a second firmware signature of a second firmware code in the second firmware image; and
   performing at least one of:
      deleting the second firmware image based on the verifying of the second firmware signature not being successful; and
      storing the second firmware image in the memory of the electronic device based on the verifying of the second firmware signature being successful.

6. The method of claim 5, wherein the verifying of the second firmware signature comprises:
   acquiring the second public key from the operating of the electronic device using the first firmware code; and
   decoding, using the second public key, the second firmware signature.

7. The method of claim 5, wherein the second public key comprises a mutable key.

8. The method of claim 5, wherein the storing of the second firmware image comprises:
   storing the second firmware image in a non-volatile memory of the electronic device, based on the verifying of the second firmware signature being successful.

9. A method for generating a firmware image of an electronic device, the method comprising:
   inserting a new firmware key into a firmware code;
   generating, using a first private key, a firmware signature of the firmware code by encoding, using the first private key, a first hash value of the firmware code, the first private key being different from the new firmware key;
   generating a firmware certificate based on the firmware code and the firmware signature by inputting the firmware code and the firmware signature into a hash function to generate a firmware hash value;
   generating the firmware image comprising the firmware code, the firmware signature, and the firmware certificate; and
   providing the firmware image to a firmware distribution device, causing the firmware distribution device to distribute the firmware image to one or more devices.

10. The method of claim 9, wherein the first private key corresponds to a first public key stored in firmware installed in the electronic device, and
   wherein the first private key comprises a mutable key.

11. The method of claim 9, wherein the generating of the firmware certificate comprises:
   inserting the firmware hash value into the firmware certificate.

12. The method of claim 11, wherein the generating of the firmware certificate further comprises:
   generating a firmware certificate signature of the firmware certificate using an immutable second private key.

13. The method of claim 12, wherein the immutable second private key corresponds to a second public key stored in the memory of the electronic device.

14. A device for updating firmware of an electronic device, comprising:
   one or more processors; and
   a memory storing instructions that, when executed by the one or more processors, cause the device to:
      verify a first firmware certificate using a first public key of the electronic device, the first firmware certificate being comprised in a first firmware image stored in the memory of the electronic device;
      verify a first firmware code comprised in the first firmware image based on a first hash value comprised in the first firmware certificate, the first hash value being generated by inputting the first firmware code and an encoded hash value of the first firmware code into a hash function, the encoded hash value of the first firmware code being encoded using a private key corresponding to a second public key different from the first public key; and
      operate the electronic device using the first firmware code based on verification of the first firmware certificate and verification of the first firmware code being successful.

15. The device of claim 14, wherein the instructions, when executed by the one or more processors, further cause the device to:

acquire the first public key stored in the memory of the electronic device; and decode, using the first public key, a first firmware certificate signature of the first firmware certificate.

16. The device of claim 14, wherein the instructions, when executed by the one or more processors, further cause the device to:

calculate a second hash value of a first firmware signature comprised in the first firmware image; and determine that the verification of the first firmware code is successful based on the second hash value being equal to the first hash value.

17. The device of claim 14, wherein the instructions, when executed by the one or more processors, further cause the device to:

download a second firmware image while operating the electronic device using the first firmware code;

verify, using the second public key, a second firmware signature of a second firmware code in the second firmware image;

delete the second firmware image based on verification of the second firmware signature not being successful; and store the second firmware image in the memory of the electronic device based on the verification of the second firmware signature being successful.

18. The device of claim 17, wherein the instructions, when executed by the one or more processors, further cause the device to:

acquire the second public key from the operating of the electronic device using the first firmware code; and decode, using the second public key, the second firmware signature.

19. The device of claim 17, wherein the instructions, when executed by the one or more processors, further cause the device to:

store the first public key in at least one of a read only memory (ROM) or a one-time programmable (OTP) memory of the electronic device, wherein the first public key comprises an immutable key, and wherein the second public key comprises a mutable key.

* * * * *